(12) United States Patent
Maybee et al.

(10) Patent No.: US 8,429,553 B2
(45) Date of Patent: Apr. 23, 2013

(54) DEBUGGING IN A MULTI-PROCESSING ENVIRONMENT BY PROVIDING DEBUGGING INFORMATION ON COMPUTER PROCESS NODES AND MESSAGES IN A GUI

(75) Inventors: Paul Maybee, Seattle, WA (US); Daniel Moth, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 79 days.

(21) Appl. No.: 12/944,761

(22) Filed: Nov. 12, 2010

(65) Prior Publication Data
US 2012/0124504 A1    May 17, 2012

(51) Int. Cl.
G06F 3/048 (2006.01)
G06F 9/44 (2006.01)
G06F 15/177 (2006.01)

(52) U.S. Cl.
USPC .............................. 715/772; 717/125; 715/736

(58) Field of Classification Search .................. 715/772; 717/125, 105
See application file for complete search history.

(56) References Cited

U.S. PATENT DOCUMENTS

| | | | |
|---|---|---|---|
| 6,438,713 B1 | 8/2002 | Taira et al. | |
| 6,516,460 B1 | 2/2003 | Merks et al. | |
| 7,003,761 B2 * | 2/2006 | Tsurugasaki | 717/125 |
| 7,353,498 B2 | 4/2008 | Gupta et al. | |
| 7,472,379 B2 | 12/2008 | Chessell et al. | |
| 7,543,276 B2 * | 6/2009 | Pfander et al. | 717/125 |
| 2007/0101327 A1 * | 5/2007 | Burdick et al. | 718/100 |
| 2009/0112666 A1 * | 4/2009 | Guo et al. | 705/7 |
| 2009/0287781 A1 * | 11/2009 | Newcomb, Jr. | 709/206 |
| 2010/0066676 A1 | 3/2010 | Kramer et al. | |

OTHER PUBLICATIONS

Claudio et al., Monitoring and Debugging Messages Passing Applications with MPVisualizer, Parallel and Distributed Processing, Processing, Proceedings, 8th Euromicro Workshop, 2000, 9 pages.*
TotalView, Blaise Barney, Lawrence Livermore National Laboratory, May 28, 2010, 28 pages.*
Claudio, et al., "Monitoring and Debugging Message Passing Applications with MPVisualizer", Retrieved at << http://ieeexplore.ieee.org/stamp/stamp.jsp?arnumber=00823433 >>, Parallel and Distributed Processing, Proceedings. 8th Euromicro Workshop, 2000, pp. 7.
Sistare, et al., "MPI Support in the Prism™ Programming Environment", Retrieved at << http://ieeexplore.ieee.org/stamp/stamp.jsp?tp=&arnumber=1592665&userType=inst >>, Supercomputing, ACM/IEEE 1999 Conference, Nov. 13-18, 1999, pp. 16.
"MPI Debugging and Profiling", http://www.pgroup.com/resources/mpitools.htm, Aug. 5, 2010, 2 pages.

\* cited by examiner

*Primary Examiner* — Doug Hutton, Jr.
*Assistant Examiner* — Li Sun
(74) *Attorney, Agent, or Firm* — Rau Patents, LLC (57) ABSTRACT

Technology is described for debugging in a multi-processor environment. An example system can include a plurality of process icons representing processes executing on compute nodes. A plurality of relationship arc icons between the process icons can represent messages being sent between source processes and destination processes on the compute nodes. A tabular display control can have rows to display attributes for relationship arc icons representing the messages being sent. In addition, a grouping module can be used to identify groups of messages that are related and to highlight relationship arc icons which are part of a group.

20 Claims, 4 Drawing Sheets

DEBUGGING IN A MULTI-PROCESSING ENVIRONMENT BY PROVIDING DEBUGGING INFORMATION ON COMPUTER PROCESS NODES AND MESSAGES IN A GUI

BACKGROUND

Parallel computing applications can use multiple processes that interact with one another to produce an application output. For processes to cooperate, the processes can communicate with each other using messages that exchange data and other inter-process information.

Parallel computing applications that have multiple processes executing at the same time can also be complex and difficult to debug. For example, certain race conditions between processes on various compute nodes can create non-deterministic states. In fact, two successive runs of a parallel application with the same input may result in different process behavior.

Data dependencies are also an important area of analysis when debugging parallel processes. A group of processes may execute more slowly than desired due to a long chain of dependent calculations (i.e., a critical path), since calculations that depend upon prior calculations in the chain will wait to be executed in order. Detecting such data dependencies can be difficult when debugging parallel computing applications.

Another example of a difficult area to debug for a parallel computing application can deadlock conditions. Deadlock may exist between processes where a first process is waiting for information from a second process before the first process can proceed and the second process is also waiting for information from the first process before the second process can proceed. A more complex case of deadlock can involve multiple processes and can be hard to detect.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for debugging in a multi-processing environment. An example system can include a plurality of process icons representing processes executing on compute nodes. A plurality of relationship arc icons between the process icons can represent messages being sent between source processes and destination processes on the compute nodes. A tabular display control can have rows to display attributes for relationship arc icons representing the messages being sent. In addition, a grouping module can be used to identify groups for messages that are related and to highlight relationship arc icons which are part of a group.

An example method is described for providing a graphical user interface for debugging in a cluster processing environment. The method can include displaying a plurality of process icons representing a plurality of processes executing on compute nodes. A plurality of relationship arc icons representing messages in message queues sent between source processes and destination processes can also be displayed. A tabular display control can be presented that has rows for displaying attributes for relationship arc icons representing the messages. A further operation can be highlighting the relationship arc icons which are part of a group.

DETAILED DESCRIPTION

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

Debugging a problem in a multi-process application can be aided by an understanding of an overall state of the application, including continuing interactions between the processes. In previous debuggers, a debugging view for one process at a time was displayed. Previous debuggers for parallel processing systems have allowed a user to select one process at a time from a list of processes. The end user could then focus on examining a state and debug variables of one process at a time. Sometimes a view of the process might be in a pop-up window with a number representing the number of the process in the overall process list. Cycling through a large list processes one at a time to get a global view of what is occurring in the parallel application can present a challenge.

For example, the state of message traffic between communicating partner processes can be difficult to discern when viewing individual processes independently. In addition, the debugging of computer programs designed to use multiple processes in a parallel processing environment can be challenging due to complexity and multi-process problems such as data dependencies, deadlock, and non-deterministic states.

In contrast, the present technology allows a user to view process states for many processes at one time. A graphical view of processes in an application executing on a cluster of processing nodes can be provided. The graphical view can include relationship arc icons representing cross process relationships and messages. The relationship arc icons can be identified as belonging to groups for messages that are related and the relationship arc icons which are part of a group can be highlighted. A state annotation icon can be applied to the process icons to represent a current process state, and a debugger imposed state icon may be applied to process icons to represent the state imposed on processes by the debugger module. The graphical user interface (GUI) view can be filtered and used as a starting point for navigation into more detailed program state information. The user interface may also provide the ability to navigate the debugger focus to a process or message where anomalous behavior seems to have occurred.

Figure 1:
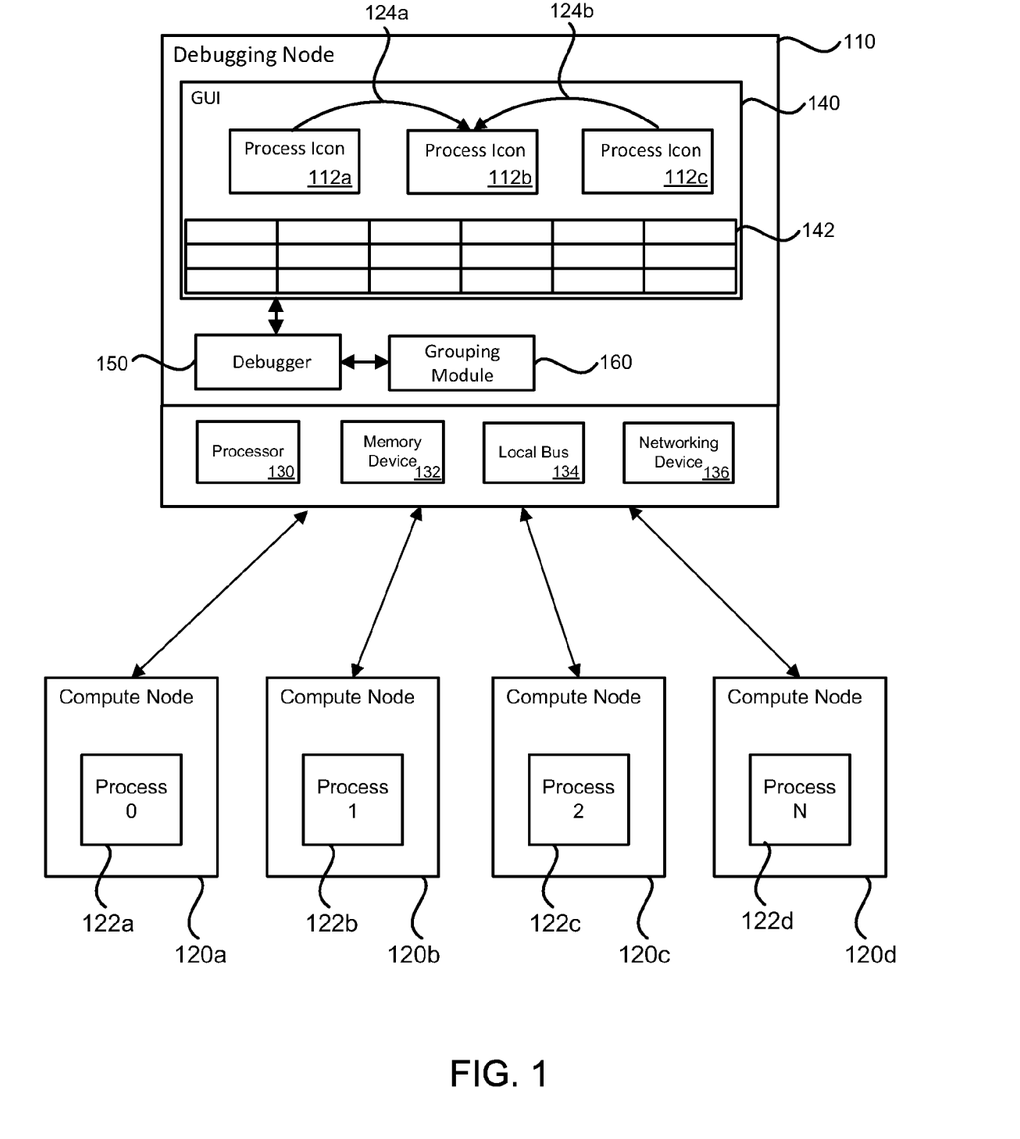
FIG. 1 is a block diagram illustrating an example system for debugging in a multi-processor environment.

FIG. 1 illustrates an example system for debugging in a multi-processor environment. The system can include a plurality of process icons 112a-c representing processes 122a-d executing on compute nodes 120a-d. A plurality of relationship arc icons 124a-d can be presented to represent messages and relationships between the processes. The relationship arc icons can represent messages being sent between source processes and destination processes on the compute nodes. Various arrow heads on the arcs can represent the different kinds of messages. Information about the messages can be retrieved from pending message queues in the processes via the debugger module 150.

The process icons and relationship arc icons may be displayed in a graphical user interface (GUI) 142 on a debugging node of the parallel processing environment. Alternatively, the GUI can be displayed on a remote computing device via a web browser or other remote access interface in communication with the debugger module 150.

A tabular display control 142 can be provided that has rows to display attributes for relationship arc icons representing the messages being passed. For example, one row may be provided for each relationship arc icon and attribute data maybe displayed for the corresponding message.

A grouping module 160 can be provided to identify groups of messages that are related. The relationship arc icons can be highlighted based on a group to which the relationship arc icons are assigned. Examples of a group into which the relationship arc may be categorized can include a deadlock group or a dependency cycle group. Logic or artificial intelligence for detecting deadlocks and dependency cycles can be included. These groups may be highlighted in a color that represents that attention should be paid to the processes, such as a red or yellow color. Alternatively, the groups may represent processes that have completed or appear to have acted properly, and these groups may be displayed with colors such as purple, blue, or green.

The debugging node 110 can display the graphical user interface for the debugger module 150 and have other modules executing on the debugging node. The debugging node may be a server, a workstation, or another computing node. The debugging node can include a hardware processor device 130, a hardware memory device 132, a local communication bus 134 to enable communication between hardware devices and components, and a networking device 136 for communication across a network with the compute nodes 120a-d, processes on the compute nodes, or other computing devices. The technology can work in many configurations. On one end of the spectrum, the processes can execute on one node and also have the debugger running on that same node. At the other end of the configuration spectrum, each process can execute on a separate compute node and the debugger can execute on a separate computing node.

While an example of hardware details for the debugging node is illustrated, a cluster processing network may contain a plurality of compute nodes that report back to a debugging node and the compute nodes 122a-d can contain processing hardware that is similar to the hardware described previously for the debugging node. In an alternative example, each compute node may have multiple processes on the compute node or one compute node can host a large majority of the processes that are being debugged.

Figure 2:
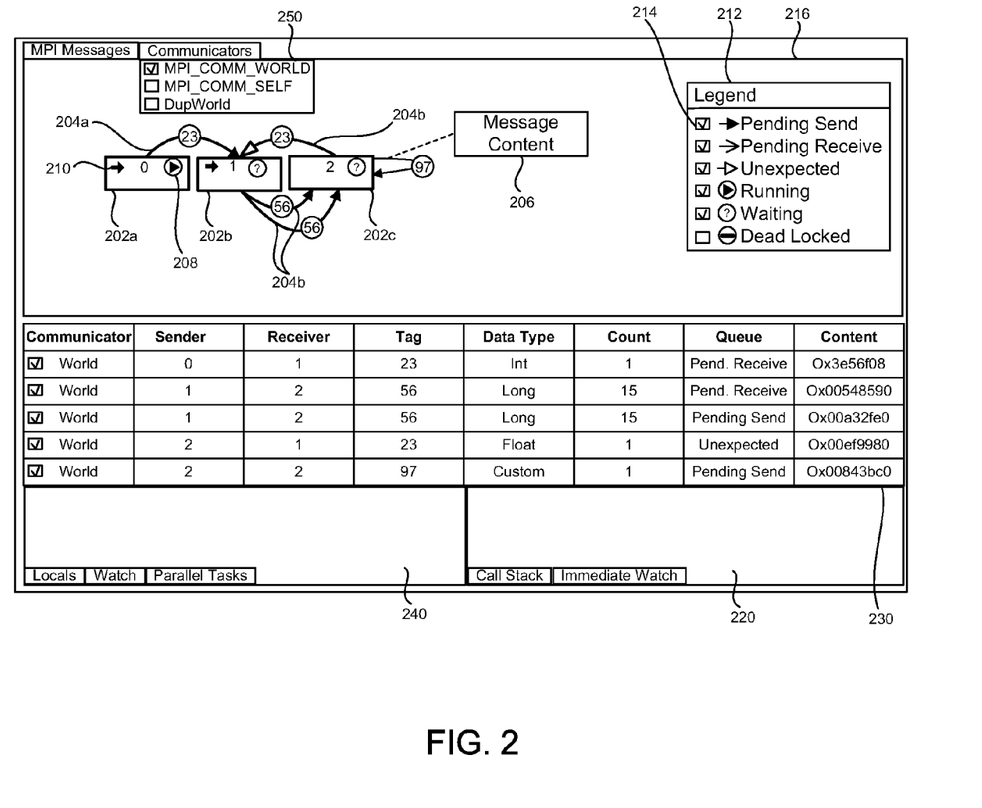
FIG. 2 illustrates an example graphical user interface for a system for debugging in a multi-processor environment.

FIG. 2 illustrates a more detailed example view of a graphical user interface that can be provided for this technology. An example of displaying process icons 202a-c and relationship arc icons 204a-204b is shown. Additional capabilities of the dynamic debug window will now be described.

A relationship arc icon 204a can be selected to enable debugging content related to the relationship arc icon to be displayed. A user interface action or gesture can be used to navigate into the relationship field content for the relationship arc icon. For example, the message content 206 of a message sent between two processes can be displayed. This allows the user of the debugging system to see the content of messages at the point an application has been stopped and the user can see the message contents based on what is in the message queue for the processes. In addition, other information regarding the relationship between processes can be displayed, if desired. An example of other information may be a parent and child relationship for the processes.

A state annotation icon 208 can also be displayed for the individual process icons. The state annotation icon can represent a current process state. For example, the displayed current process state may include: a ready state, an executing state, a blocked state, a waiting state, a deadlocked state, and a terminated state. Being able to identify a process state graphically while examining the interactions between a particular process and the other processes can help identify problem processes or other application bugs.

The state indications for the process can be displayed via both a color on the process icon representing the process and a corresponding icon on the process. The colors used may be green, yellow and red, while the corresponding icons are the running, waiting and deadlock icons. Hovering over the waiting or deadlocked icon can bring up a tool tip showing the detailed state information, e.g., information about the blocked process and the location of the blocked thread.

A debugger annotation icon 210 can be applied to the process icons. A debugger imposed process state can be represented by the debugger annotation icons displayed on the process icons 202a-c. Examples of a debugger imposed process state may include: a current focus state, breaking process state, a running process state, and a frozen process state. The debugger may set the state of some of the processes based on the user's direct instructions, in response to a break-point reached in one process, or based on a process crash. Such icons allow a user who is debugging a process to be able to identify the debugger applied process states.

As discussed above, the current focus and breaking point icons can be indicated with the process icon or process block. When the debugger is invoked (e.g. via a breakpoint, exception thrown, or the user hitting a pause icon in the debugger interface) a current thread can be indicated by an arrow icon of a first color displayed on the process icon. The current thread is the thread whose current stack frame drives the various variable (i.e., expression) display areas like the locals variables, automatically displayed variables, and watched variable display areas. The user can switch the current thread to be another thread, if desired. When the user manually switches to another thread and makes the newly selected thread "current", recalling which thread was current when the debugger was invoked can be useful to the user doing the debugging (sometimes referred to as the "breaking" thread). The breaking thread is indicated by an arrow icon of a second color.

A filtering legend 212 can be provided that has legend item controls 214. The legend item controls can enable the display of the process icons to be toggled on or off. In other words, processes may be added or removed from the display area based on a process state type filter selected from the legend items controls. For example, if the user wants to see the running processes but none of the waiting processes, then the check box for the running processes can be selected and the checkbox for the waiting processes may not be selected.

While checkboxes are shown as a possible graphical user interface control, other types of controls may be used. Examples of possible controls can include: buttons, menus, non-exclusive radio buttons, a list of options that can be highlighted, or any other graphical control useful for selection.

The filtering legend can also be used to filter the relationship arc icons displayed by relationship type. By selecting or unselecting the relationship types in the filtering legend, the relationship arc icons may be removed or added to the display. This relationship arc filtering allows the user to examine a reduced set of relationship arcs that might be related to a debugging problem. The interface can allow the user to see messages between processes that are pending send, pending receive, and what other unexpected messages exist.

The interface described in this description can be used when the debugger module 150 is invoked. Displaying process information and process relations can help users identify race conditions, deadlocks, and other unexpected problems.

The display field 216 can also provide an ability to rearrange the process icons or graph nodes representing the processes via direct interaction with the diagram. For example, the processes can be rearranged using a mouse drag, a mini overview map, or an auto arrange function. The ability to re-layout the diagram as desired can be provided via button or menu item (e.g., a toolbar button).

An example of a message passing and high-performance computing communication environment with which this technology may be used is the Message Passing Interface (MPI), and MPI is an interface application programming interface (API) layer that allows processes on clusters, parallel computing systems, and supercomputers to communicate with one another. MPI is a language-independent communications protocol where point-to-point and collective communication are supported. MPI can also be used on multi-processor systems that have shared memory.

Part of the MPI specification includes debugging APIs, which can enable access to the process message queues to see what types of messages are in the queues, (e.g., pending receives, pending sends, and unexpected messages). An example operating system that the MPI API can be used with is MICROSOFT®'s WINDOWS® (High Performance Computing) HPC Server.

The user interface area 216 or diagram can focus on one communicator in MPI at a time, and the user can switch the communicator being focused on from a combo box 250. A communicator is an MPI grouping capability that allows a user to group together communications based on defined virtual topologies. If the ability to focus on multiple communicators is provided, this information may appear on a tool tip of the arrow on the diagram. The communicator can also be used in the point-to-point or collective communication. Communicators are MPI objects that can be stored in system space and accessed by handles returned from or passed to MPI routines.

FIG. 2 further illustrates an example of a tabular display control 230. The tabular display control can contain a row of data for individual messages or inter-process communications to enable the user to view additional details regarding the communications or messages. Each column can contain an attribute of the messages or relationships. The tabular display control can allow the user to sort and group the relationship data in tabular form. The data may be sorted based on a column that the user selects as the sorting column Alternatively, the rows may be grouped based on the values in a column, user defined data, defined types of identified errors, or communications types.

In the example tabular display, information for MPI messages may be presented to the user in tabular format using a list view control. The column headers representing the information available may mirror or be a sub-set of what is received from the MPI debug API as shown below:

| Communicator | Source Rank | Destination Rank | Tag | Count | Data Type | Content | MPI Queue/ Status |
|---|---|---|---|---|---|---|---|
| Name (string) | (int) | (int) | (int) | (int) | type (string) | address | (enum) |

Specifically, a row from the message debug information can contain a name of the MPI communicator being used, an identifier for the source and destination processes (source rank and destination rank), a tag type for the message type, a count of the number of data elements received, the data type of the data elements, the address location of the message content, and the queue status of the message.

Process icons 202a-c can be directly selected by a user to direct focus to the process and display process related debugging information. The selection may be made using a user controllable pointing device such as a mouse, pen, or a touch screen. Various gestures may be used to activate a focus on the process. For example, the process can be selected using a single click, double click, circling gesture, crossing gesture or another desired gesture. The process icon can be selected and highlighted using a color surrounding the icon or the color of the icon may be changed, modified, inverted or otherwise highlighted. Once a process selection is made, the related debugging information for the process can be displayed in another window, viewable pane or another user interface control. As in the example display area 220, details about the process such as the program stack, immediately watched variables, memory view area, or other information about the process can be displayed.

A process can be thought of as a collection of threads and this thread information can be displayed in the graphical user interface. A graphical element can be provided to represent a collection of threads in a parallel stacks window 240. For a node with coalesced stack frames from multiple threads that is shown in the parallel stacks window, a tool tip can be provided that shows information such as thread ID and the memory locations of the threads. Similar tool tips can be provided when hovering over a process icon, which can show thread information for the process.

Figure 3:
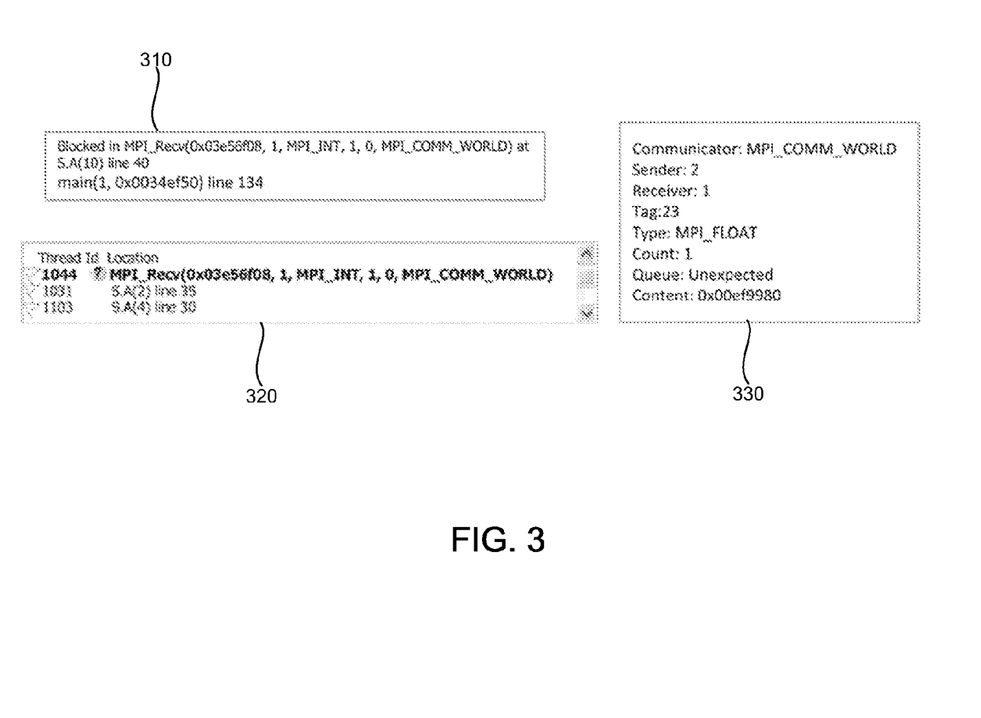
FIG. 3 illustrates example tool tips for a system for debugging in a multi-processor environment.

FIG. 3 illustrates some example tool tips. One tool tip is an example tool tip for a blocked process icon 310. Another tool tip is for a process icon 320. Yet another tool tip example is for a message/arrow 330. The tool tips can be displayed when the user's pointer hovers over the corresponding process icon or relationship arc icon.

A pop-up context menu for the process icon can provide further actions such as: detach, terminate, and switch to process functions. For example, a user may be able to right click on a process icon and activate the described functions. Additionally, thread functions can be provided with the process icon or in the thread display area. Examples of thread functions can include: flag process threads, unflag process threads, freeze threads, and thaw threads.

Selection of the process icon by a user can also be used to control the scheduling of the process. Examples of this scheduling control are where a process is frozen or thawed based on selecting the process icon. Any one of a number of user interface actions or gestures can be used to control the scheduling (e.g., freezing, thawing, etc.) of processes being debugged.

This technology can detect which threads are blocked and indicate this blocking information to the user using a status icon. By extension, a blocked thread for a single threaded process means that the process is also blocked. In addition, a status icon or a separate icon can indicate that the process contains at least one blocked thread. A further special case of blocking is displaying when a process is deadlocked with others (i.e., detecting a cycle of blocked processes).

Figure 4:
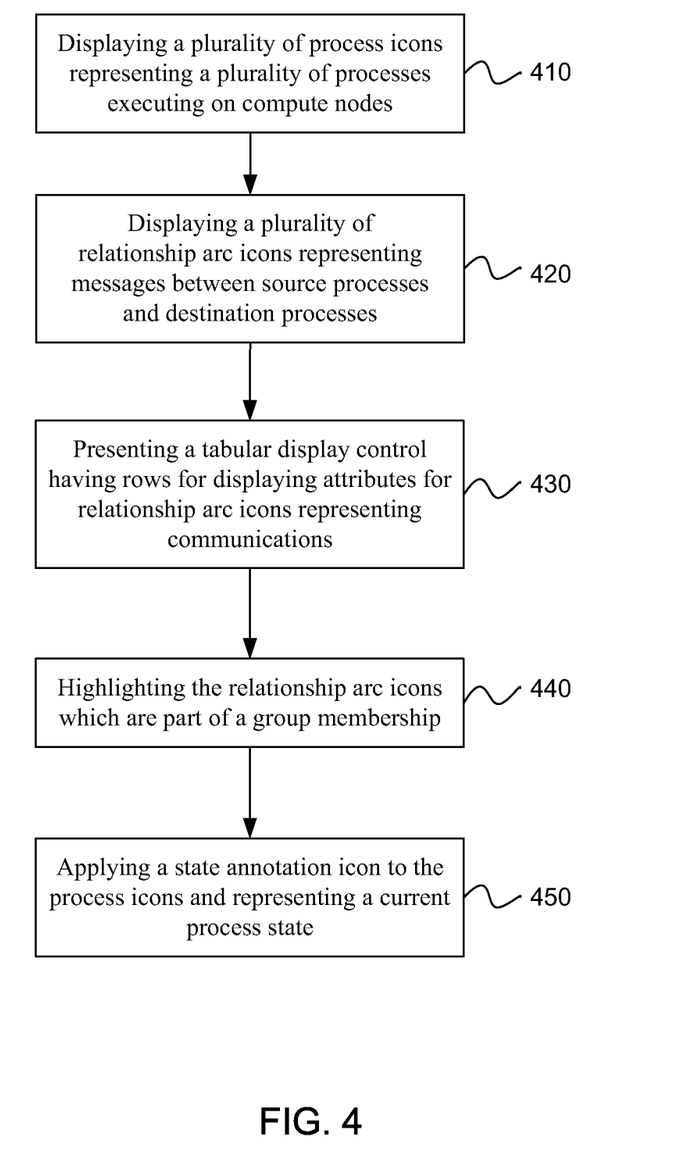
FIG. 4 is a flowchart illustrating an embodiment of a method for providing a graphical user interface for debugging in a cluster processing environment.

FIG. 4 illustrates a method for providing a graphical user interface for debugging in a cluster processing environment. The method can include the operation of displaying a plurality of process icons representing a plurality of processes executing on compute nodes, as in block 410. A plurality of relationship arc icons can also be displayed that represent messages sent between source processes and destination processes, as in block 420. The messages may be sent between message queues of the processes.

A tabular display control can be displayed that has rows for displaying attributes for relationship arc icons representing messages or communications, as in block 430. The tabular display can provide additional detailed message or communication information in a grid, list or other format related to the relationship arc icons.

The relationship arc icons which are part of a group can be highlighted, as in block 440. The groups can be groups of processes that are classified based on a deadlock, data dependency, a message flow problem between multiple processes, or other detected group. In addition, a relationship arc icon can be selected to enable content of a message to be displayed to a user.

A state annotation icon can be applied to the process icons, and the state annotation icons can represent a current process state, as in block 450. As discussed before, a current process state may include a current focus state, breaking process state, a running process state, and a frozen process state. Debugger annotation icons can also be applied to the process icons to represent a debugger imposed process state, such as a current focus state, breaking process state, a running process state, and a frozen process state.

If the amount of data displayed in the process and relationship arc diagram is overwhelming, the user may want to filter out some relationship arc icons or arrows and process icons from the diagram. As discussed earlier, a filtering legend can be used that has selectable legend items to enable process icons to be hidden or displayed in response to the selectable legend items.

Alternative ways of enabling the diagram to be simplified can also be provided. For example, in the tabular view, rows representing a message can include a checkbox in front of the row that when unchecked means the relationship arc icon representing the message will not display on the diagram and checking the box will make the relationship icon reappear. Another example of filtering processes and relationship arc icons can be accomplished directly on the diagram via a context menu (e.g., popup menu) for the process or relationship arc that includes the menu item: "Hide".

Another way to filter out a set of relationship arc icons representing messages and other relationship information is via the legend on the diagram. The legend can list the arrow heads and what the arrow heads on the relationship arc icons represent. The descriptions about a relationship arc icon can have a checkbox so the user can uncheck the box and thus hide, for example, the "Pending Send" messages. Checking or unchecking items on the legend can add or remove items in the tabular representation of messages.

The diagram legend may also list colors and icons for the checkbox representations and have checkboxes in front of the legend items. For example, unchecking the box in front of the explanation for the unexpected messages arrow head can hide the unexpected messages from the diagram (the tabular list of messages may also reflect this change by having those messages appear unchecked).

A different way to filter items is via a toolbar option titled "show flagged only", which can result in displaying processes where at least one of its threads is flagged. This option can be different compared to the others just described in that the information does not just disappear from the diagram, but does not appear in the tabular list of messages either.

This technology provides an annotated graphical view of multi-process program state with cross process relationships. The graphical view can include a representation of messages and relationships as arcs between processes. These relationship arcs can be highlighted to show group memberships.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. The "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

The invention claimed is:

1. A system for debugging in a multi-processing environment, comprising:
    a plurality of compute nodes, each of the plurality of compute nodes having at least one process executing on the compute node;
    a debugging node, the debugging node comprising:
    a processor;
    a graphical user interface configured to display:
        a plurality of process icons, the plurality of process icons representing processes executing on the plurality of compute nodes;
        a plurality of relationship arc icons connecting between different ones of the plurality of process icons, each of the plurality of relationship arc icons representing a message or a group of messages being sent between processes executing on the plurality of compute nodes;
        a tabular display control, the tabular display control having a plurality of rows to display attributes associated with the plurality of relationship arc icons and attributes for the message or group of messages corresponding with the relationship arc icon;
    a grouping module configured to identify at least one group of messages that are sent between the processes executing on the plurality of compute nodes that are related and to associate the at least one group of messages with at least one of the plurality of relationship arc icons and to highlight relationship arc icons which are part of the at least one group; and
    a debugger module configured to provide information to the grouping module and the tabular display control about the messages in a pending message queue for each of the processes executing on the plurality of compute nodes.

2. The system as in claim 1, wherein the group is a deadlock group or a dependency cycle group.

3. The system as in claim 1, wherein selecting a relationship arc icon enables content of a message to be displayed.

4. The system as in claim 1, further comprising a state annotation icon applied to the process icons and representing a current process state.

5. The system as in claim 4, wherein the current process state that is selected from the group consisting of a ready state, an executing state, a blocked state, a waiting state, a deadlocked state, and a terminated state.

6. The system as in claim 1, further comprising a debugger annotation icon applied to the process icons and representing a debugger imposed process state.

7. The system as in claim 6, wherein the debugger imposed process state is selected from the group comprising a current focus state, breaking process state, a running process state, and a frozen process state.

8. The system as in claim 1, further comprising a filtering legend having legend item controls which can be selected to toggle viewing of process icons.

9. The system as in claim 1, wherein a process icon can be selected by a user to direct focus to the process and display process related debugging information.

10. The system as in claim 1, wherein a process icon can be selected by a user to control the scheduling of the process.

11. The system as in claim 10, wherein controlling the scheduling further comprises controlling whether a process is frozen or thawed based on selecting the process icon.

12. A method for providing a graphical user interface for debugging in a multi-processing environment, comprising:
    displaying a plurality of selectable process icons representing a plurality of processes executing on a plurality of compute nodes, wherein the selectable process icons provide a user with information related to the process associated with the process icon in response to the user selecting the process icon;
    displaying a plurality of relationship arc icons connecting between different ones of the plurality of process icons, each of the plurality of relationship arc icons representing messages in message queues sent between source processes and destination processes executing on the plurality of compute nodes;
    presenting a tabular display control having a plurality of rows for displaying attributes associated with the plurality of relationship arc icons and attributes for the messages in the message queues corresponding with the relationship arc icon;
    grouping, by a grouping module, the plurality of relationship arc icons into a plurality of groups that are related to each other based upon a common message attributes;
    highlighting the relationship arc icons that are identified as being part of a group by the grouping module, such that different ones of the plurality of groups is separately highlighted;
    configuring a debug module for providing information to the grouping module and the tabular display control about the messages in a pending message queue for each of the processes executing on the plurality of computing nodes; and
    applying a state annotation icon to the plurality of process icons to represent a current process state.

13. The method as in claim 12, further comprising selecting a current process state from a group consisting of a current focus state, breaking process state, a running process state, and a frozen process state.

14. The method as in claim 12, further comprising applying a debugger annotation icon to the process icons to represent a debugger imposed process state.

15. The method as in claim 14, wherein the debugger imposed process state is selected from a group comprising a current focus state, breaking process state, a running process state, and a frozen process state.

16. The method as in claim 12, further comprising displaying a filtering legend having selectable legend items to enable process icons to be hidden or displayed in response to the selectable legend items.

17. The method as in claim 12, further comprising selecting a relationship arc icon enables the content of a message to be displayed.

18. A method for providing a graphical user interface for debugging in a multi-processing environment, comprising:
displaying a plurality of selectable process icons representing a plurality of processes executing on a plurality of compute nodes in a display area, wherein the selectable process icons provide a user with information related to the process associated with the process icon in response to the user selecting the process icon;
displaying a plurality of relationship arc icons representing messages in message queues that are being sent between source processes and destination processes;
annotating the plurality of process icons with a debugger imposed process state;
presenting a tabular display control having a plurality of rows for displaying attributes associated with the plurality of relationship arc icons and attributes for the messages in the message queue corresponding with the relationship arc icon;
grouping, by a grouping module, the plurality of relationship arc icons into a plurality of groups that are related to each other based upon a common message attribute;
configuring a debug module for providing information to the grouping module and the tabular display control about the messages in a pending message queue for each of the processes executing on the plurality of computing nodes; and
highlighting the relationship arc icons that are identified to be in a group.

19. The method as in claim 18, further comprising displaying a filtering legend having legend item controls which can be selected to toggle viewing of process icons.

20. The method of claim 18, further comprising filtering the plurality of relationship arc icons based upon the common message attribute.

* * * * *